(12) United States Patent
Kiessner et al.

(10) Patent No.: US 11,697,556 B2
(45) Date of Patent: Jul. 11, 2023

(54) DYNAMIC CONVEYOR SYSTEM FOR CUSTOM SIZED PACKAGING

(71) Applicant: Packsize LLC, Salt Lake City, UT (US)

(72) Inventors: Hanko Kiessner, Salt Lake City, UT (US); Thomas Lamb, Syracuse, UT (US); David Iverson, Stansbury Park, UT (US); Rod Gallaway, McRae, AR (US); Brady Sjoblom, North Ogden, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 0 days.

(21) Appl. No.: 17/165,689

(22) Filed: Feb. 2, 2021

(65) Prior Publication Data

US 2021/0245960 A1    Aug. 12, 2021

Related U.S. Application Data

(60) Provisional application No. 63/041,640, filed on Jun. 19, 2020, provisional application No. 62/972,524, (Continued)

(51) Int. Cl.
*B65G 35/06* (2006.01)
*B65G 43/08* (2006.01)

(52) U.S. Cl.
CPC .............. *B65G 35/06* (2013.01); *B65G 43/08* (2013.01); *B65G 2207/08* (2013.01); *B65G 2207/42* (2013.01)

(58) Field of Classification Search
CPC .... B65G 35/06; B65G 43/08; B65G 2207/08; B65G 2207/42

(Continued)

(56) References Cited

U.S. PATENT DOCUMENTS 4,262,471 A * 4/1981 Russell .................... B43M 7/00
                                                           53/569
8,365,902 B2 * 2/2013 Costanzo ............... B65G 17/40
                                                           198/779

(Continued)

FOREIGN PATENT DOCUMENTS

EP          1688375 B1          8/2006
WO     WO-2006095047 A1 *  9/2006   ........... B65G 1/0435

(Continued)

OTHER PUBLICATIONS

JP2008532883 (Year: 2008).*

(Continued)

*Primary Examiner* — Gene O Crawford
*Assistant Examiner* — Lester Rushin, III
(74) *Attorney, Agent, or Firm* — Workman Nydegger

(57) ABSTRACT

A conveyor system includes a rail having one or more channels therein and one or more sleds operatively associated with the rail. A sled can include a body and one or more wheels mounted on the body and configured to move through the one or more channels in the rail. A sled can also include a holding device connected to the body. The holding device can be configured to engage a packaging container to move the packaging container along the rail. Multiple sleds can be used to secure a packaging container therebetween and move the packaging container along the rail. The conveyor system may also include a queue system that dynamically moves packaging containers to packaging stations.

20 Claims, 11 Drawing Sheets

Related U.S. Application Data filed on Feb. 10, 2020, provisional application No. 62/972,527, filed on Feb. 10, 2020, provisional application No. 62/971,609, filed on Feb. 7, 2020, provisional application No. 62/971,753, filed on Feb. 7, 2020.

(58) Field of Classification Search
 USPC .......................................................... 198/620
 See application file for complete search history.

(56) References Cited

U.S. PATENT DOCUMENTS

| | | | |
|---|---|---|---|
| 9,181,034 B2 | 11/2015 | Peters et al. | |
| 10,414,587 B2* | 9/2019 | Wehner | B65G 1/065 |
| 10,894,663 B2* | 1/2021 | Kapust | B65G 1/0492 |
| 11,137,772 B2 | 10/2021 | Theobold | |
| 11,581,838 B2* | 2/2023 | Sun | B65G 35/06 |
| 2008/0281717 A1* | 11/2008 | Kortelainen | B65G 1/0464 705/28 |
| 2017/0320102 A1* | 11/2017 | McVaugh | B07C 5/38 |
| 2023/0074095 A1 | 3/2023 | Kiessner et al. | |

FOREIGN PATENT DOCUMENTS

| | | | | |
|---|---|---|---|---|
| WO | WO-2009098573 A1 * | 8/2009 | ........... | B65G 1/0407 |
| WO | 2009115988 A1 | 9/2009 | | |
| WO | 2019/115988 A1 | 6/2019 | | |

OTHER PUBLICATIONS

International Search Report and Written Opinion received for PCT Patent Application No. PCT/US21/16899, dated Jun. 14, 2021, 4 pages.

* cited by examiner

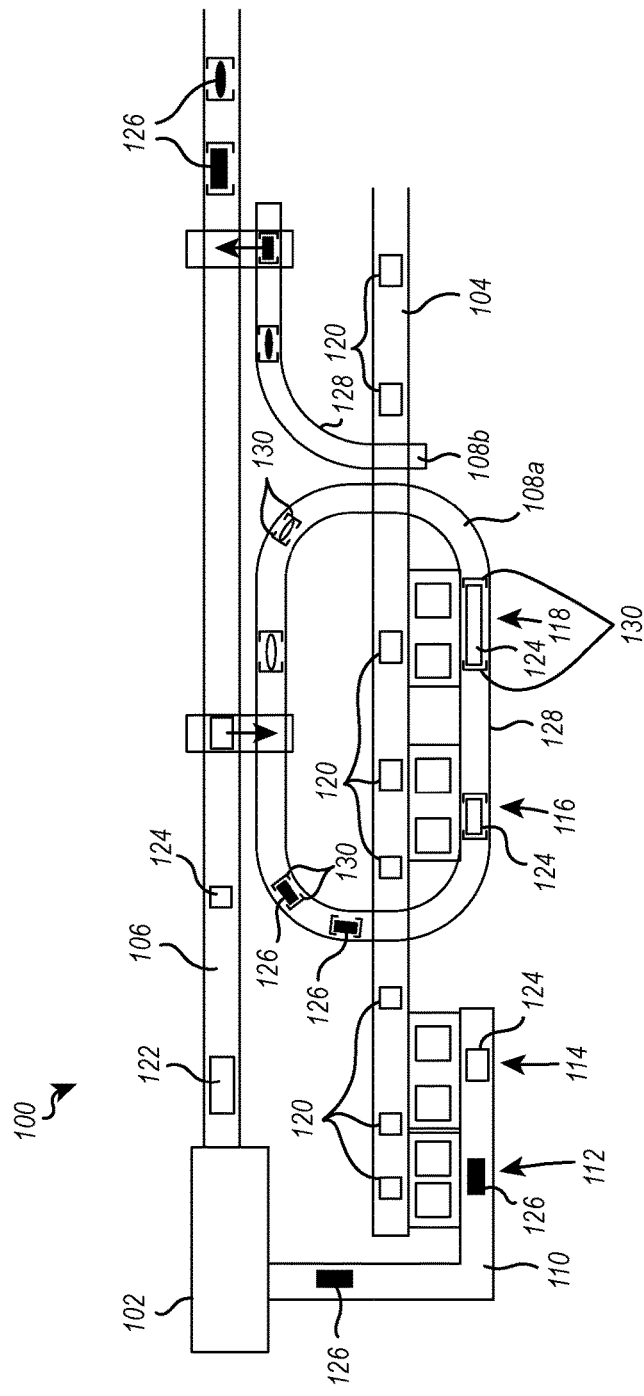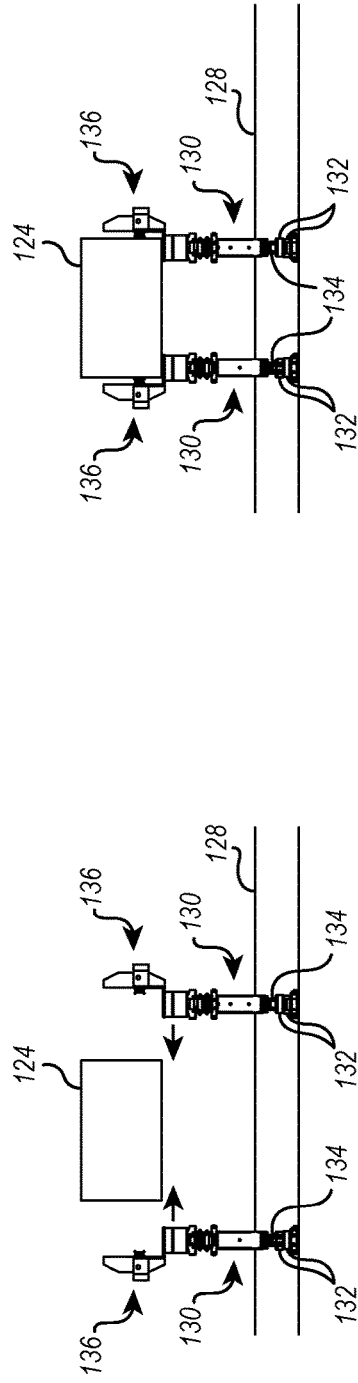

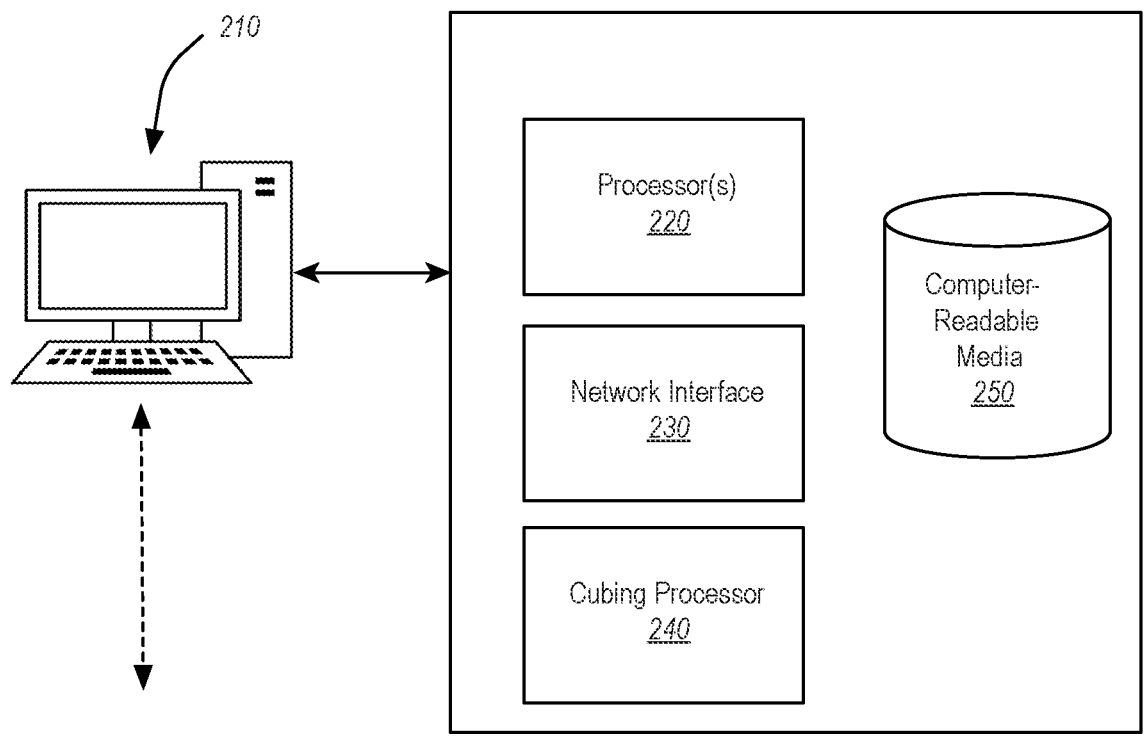
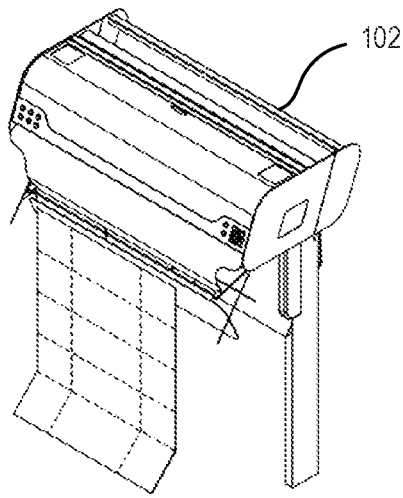
FIG. 12

DYNAMIC CONVEYOR SYSTEM FOR CUSTOM SIZED PACKAGING

CROSS-REFERENCE TO RELATED APPLICATION

The present application claims priority to and benefit of U.S. Provisional Application No. 63/041,640, filed Jun. 19, 2020, and entitled High-Speed Custom Corrugate Container Delivery System, U.S. Provisional Application No. 62/972,524, filed Feb. 10, 2020, and entitled High-Speed Custom Corrugate Container Delivery System, U.S. Provisional Application No. 62/972,527, filed Feb. 10, 2020, and entitled Dynamic Conveyor System for Custom Sized Packaging, U.S. Provisional Application No. 62/971,609, filed Feb. 7, 2020, and entitled High-Speed Custom Corrugate Container Delivery System, and U.S. Provisional Application No. 62/971,753, filed Feb. 7, 2020, and entitled Dynamic Conveyor System for Custom Sized Packaging, the entire content of each of which is incorporated herein by reference.

BACKGROUND

1. Technical Field

Exemplary embodiments of the present disclosure relate to systems, methods, and devices for transporting goods and/or packaging containers (e.g., box, envelopes, etc.). More specifically, exemplary embodiments relate to dynamic conveyor systems, devices, and methods for transporting goods and/or custom packaging containers.

2. The Relevant Technology

In the fulfillment industry, goods are often stored in a warehouse or distribution center, where they are picked, packed, and shipped to meet the content requirements of a specific order. Using conventional packing means, order fulfillment typically involves a human operator receiving an order, selecting (and possibly assembling) a packaging container (e.g., cardboard box, envelope, etc.), picking goods (e.g., from warehouse shelves), packing the goods in the packaging container, and sealing and otherwise preparing the filled packaging container for shipment. In another example, a fulfillment center may include a number of packing stations, where a human operator receives pre-picked goods (e.g., goods picked by another human), selects (and possibly assembles) a packaging container, moves the pre-picked goods into the packaging container, and seals and otherwise prepares the filled packaging container for shipment.

In an effort to improve the efficiency of fulfillment or other distribution centers, recent developments have introduced automation and customization into various aspects of the fulfillment industry. For instance, custom packaging systems have been developed that dynamically produce packaging containers that are custom-sized for a particular order, while optimizing use of packaging material (e.g., cardboard). Similarly, automated or semi-automated systems have been developed for picking goods (e.g., from warehouse shelves), packing the goods in the packaging container, and sealing and otherwise preparing the filled packaging container for shipment.

Fulfillment or other distribution centers often employ conveyor systems to transport goods and packaging containers between various locations within the facilities. Such systems can increase the speed and efficiency at which packaging containers are packed and shipped. Typical conveyor systems include tracks with rollers and/or conveyor belts mounted thereon. The rollers and/or conveyor belts rotate to move goods and/or packaging containers along the conveyor systems between locations. Typical conveyor systems can operate with limited speeds. If the speeds of the conveyor systems are increased too much, the goods and/or packaging containers may slip, tip over, or even fall off of the conveyor system. In an effort to allow for the speed of conveyor systems to be increased without causing the goods and/or packaging containers to slip, tip or fall off of the conveyor system, holding devices have been added to some conveyor systems. The holding devices may interact with the goods and/or packaging containers to counteract forces that may cause the goods and/or packaging containers to slip, tip, or fall off of the conveyor systems.

However, the holding devices currently in use are designed to be used with goods and/or packaging containers of particular sizes. For instance, a conveyor system may include holding devices that can interact with packaging containers of only one size. If a packaging container of a different size (e.g., larger or smaller) were transported on such a conveyor system, the holding devices may not be able to effectively hold the packaging container. As a result, the larger or smaller packaging container may slip, tip, or fall off of the conveyor system if the speeds of the conveyor system increase too much.

In view of the foregoing, there remains room for improvement in the field of conveyor systems and the order in which packaging containers are created and packaged.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments comprise methods, devices, and computer systems for high-speed and high-efficiency packaging of items, including movement of packaging containers and to-be-packaged items. For instance, in one embodiment, a conveyor system includes a rail having one or more channels therein and a sled operatively associated with the rail. The sled includes a body, one or more wheels mounted on the body and configured to move through the one or more channels in the rail, and a holding device connected to the body, the holding device being configured to engage a packaging container to move the packaging container along the rail.

In another embodiment, a method of transporting a packaging container is provided. The method includes positioning a packaging container between a first sled and a second sled of a conveyor system, moving one or both of the first sled and the second sled towards the packaging container, securing the packaging container between the first sled and the second sled, and moving the first sled and the second sled along a rail of the conveyor system to transport the packaging container along the rail.

In at least one embodiment, a computer system receives a particular packaging container on a particular dynamic transportation mechanism. The particular dynamic transportation mechanism is configured to automatically physically size itself to carry the particular packaging container. Additionally, the computer system associates, with the one or more processors, the particular packaging container with a particular donor bin. The particular donor bin contains at least one of the one or more target products. The computer system also generates a queue command that is configured to cause the particular dynamic transportation mechanism to physically move itself into a queue of a set of dynamic transportation mechanisms. The computer system then receives a request to package a second packaging container with a particular item. The particular item is also associated with the particular donor bin. Further, the computer system generates a packing command that is configured to cause both the particular dynamic transportation mechanism to physically move itself out of the queue and to a particular packing station where the particular donor bin is location, and a second dynamic transportation mechanism associated with the second packaging container to physically move itself to the particular packing station.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1 illustrates a portion of a fulfillment or distribution center system according to an example embodiment;

FIGS. 2A and 2B illustrate an example conveyor system for use in the system illustrated in FIG. 1 according to an example embodiment;

FIG. 12 illustrates a schematic diagram of a computer system for high-speed packaging container delivery;

DETAILED DESCRIPTION

Figure 3:
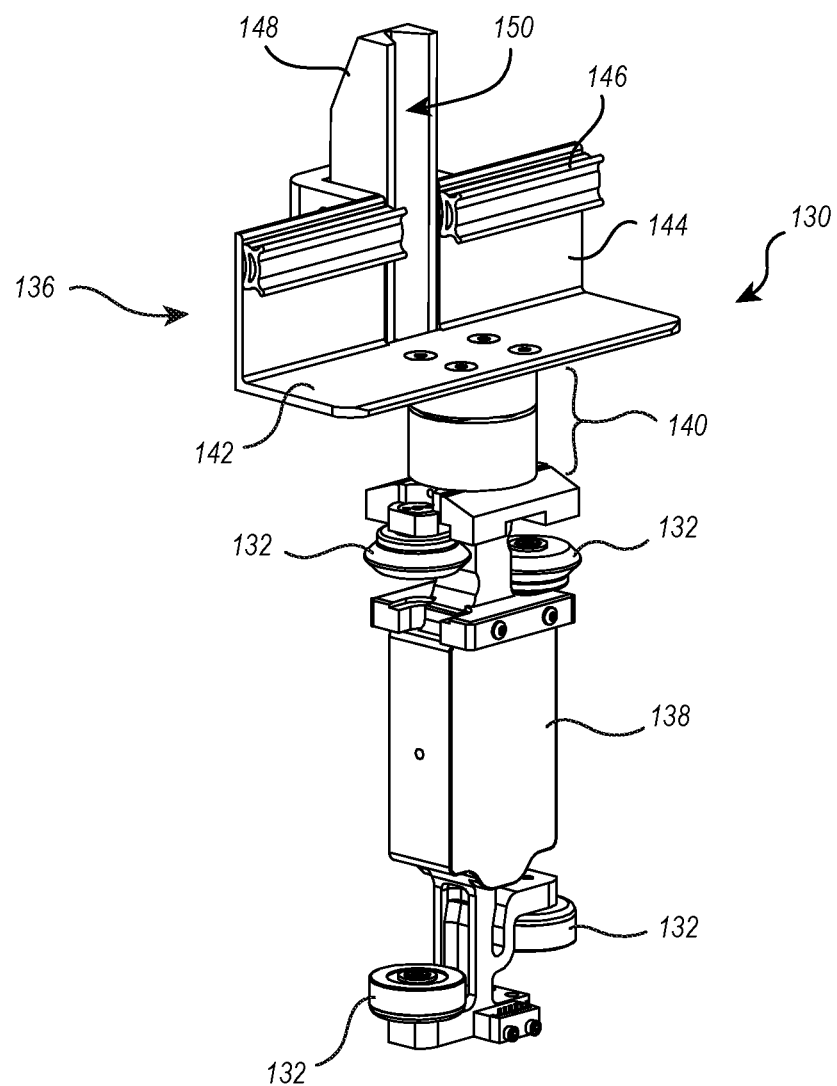
FIGS. 3-4B illustrate example sleds for use with the conveyor system of FIGS. 2A and 2B according to an example embodiment.

Exemplary embodiments of the present disclosure relate to systems, methods, and devices for transporting goods and/or packaging containers (e.g., box, envelopes, etc.). More specifically, exemplary embodiments relate to high speed and/or dynamic conveyor systems, devices, and methods for transporting goods and/or custom packaging containers.

While the present disclosure will be described in detail with reference to specific configurations, the descriptions are illustrative and are not to be construed as limiting the scope of the present invention. Various modifications can be made to the illustrated configurations without departing from the spirit and scope of the invention as defined by the claims. For better understanding, like components have been designated by like reference numbers throughout the various accompanying figures.

FIG. 1 illustrates a perspective view of a portion of a fulfillment or distribution center system 100. The illustrated system 100 includes a packaging machine 102, conveyor systems 104, 106, 108a, 108b, 110, and pack stations 112, 114, 116, 118. Packaging machine 102 may convert raw materials (e.g., sheet material, corrugate material, cardboard, etc.) into packaging templates and/or packaging containers (e.g., formed from the packaging templates and which are at least partially assembled). As used herein the terms "custom-made container," "packaging container," and the like include both a packaging template, a partially or completely assembled box, an envelope (e.g., formed from the packaging templates which are at least partially assembled), and/or any other packaging component. As will be discussed further below, packaging machine 102 may optionally close, seal, and/or label packaging containers that have been filled with products. In various embodiments disclosed herein, packaging containers may comprise custom-made containers or pre-cut containers. As such, the described packaging production machine 102 may not be present in every embodiment.

The various conveyor systems 104, 106, 108a, 108b, 110 of system 100 may transport to-be-packaged goods (also referred to herein as "target products"), packaging templates, and/or packaging containers (either empty or filled). For instance, conveyor system 104 may transport to-be-packaged goods 120 from a warehouse or other storage area to pack stations 112, 114, 116, 118. In at least one embodiment, the to-be-packaged goods 120 are transported within "donor bins." As used herein, a "donor bin" comprise any means by which to-be-packaged goods are transported on conveyor systems 104, 106, 108a, 108b, 110. In at least one embodiment, a "donor bin" comprises a container that includes multiples of a single type of product. Similarly, conveyor system 106 may transport packaging templates 122 and/or packaging containers 124 from packaging machine 102 to conveyor system 108a. In some embodiments, as discussed below, conveyor system 106 may also transport filled packaging containers 126 to a shipping or other area of the fulfillment or distribution system 100.

Conveyor system 108a may transport packaging templates 122 and/or packaging containers 124 to pack stations 116, 118. At pack stations 116, 118, packaging templates 112 may be assembled into packaging containers 124. Alternatively, the packing stations 116, 118 may receive already assembled packaging containers 124. Whether the packaging containers 124 are assembled by packaging machine 102, at pack stations 116, 118, or at another location, the assembled packaging containers 124 can be filled with the goods 120.

In some embodiments, packaging containers 124 are custom sized to fit particular goods 120 or groups of goods 120. The particular goods 120 or groups of goods 120 can be associated with the appropriate custom sized packaging containers 124 at pack stations 116, 118 and the particular goods 120 or groups of goods 120 can be packed into the associated custom sized packaging containers 124.

Filled packaging containers 126 may be transferred from conveyor system 108a to conveyor system 106. Alternatively, filled packaging containers 126 may be transferred from conveyor system 108a to conveyor system 108b. Conveyor system 108b may then transfer filled packaging containers 126 to conveyor system 106. In either case, filled packaging containers 126 may be transported by conveyor system 106 to another area of system 100.

In some embodiments, packaging templates 122 and/or packaging containers 124 may be transferred from conveyor system 106 to conveyor system 108a. The packaging templates 122 and/or packaging containers 124 may thereafter be transferred to conveyor system 104. Conveyor system 104 may transport packaging templates 122 and/or packaging containers 124 to pack stations 112, 114. At pack stations 112, 114, packaging templates 122 may be assembled into packaging containers 124 and goods 120 may be packed therein. Conveyor system 110 can then transport the filled packaging containers 126 to packaging machine 102, which can complete one or more additional steps of the packaging process (e.g., adding protective fill material into the filled packaging containers 126, closing the filled packaging containers 126, applying labels, etc.). Thereafter, the completed packaging containers 126 may be transported to another area of system 100 via conveyor system 106.

Conveyor systems 104, 106, 108a, 108b, 110 may have substantially similar configurations or constructions as one another or may have different configurations or constructions from one another. For instance, one or more of conveyor systems 104, 106, 108a, 108b, 110 may include rollers, wheels, or belts that rotate to move goods, packaging templates, or packaging containers there along. In contrast, as discussed in more detail below, one or more of conveyor systems 104, 106, 108a, 108b, 110 may include tracks or rails and sleds for moving goods, packaging templates, or packaging containers. In the illustrated embodiment, conveyor systems 108a, 108b include tracks or rails 128 and sleds 130.

Attention is now directed to FIGS. 2A and 2B, which illustrate an example embodiment of track or rail 128 and a pair of sleds 130. In the illustrated embodiment, sleds 130 are movable along rail 128. For instance, in the illustrated embodiment, sleds 130 include wheels 132 that can roll within channels of rail 128. In other embodiments, wheels 132 could be supplemented or replaced with low friction sliders that slide within channels of rail 128. In still other embodiments, wheels 132 and the channels of rail 128 may be supplemented or replaced with sprockets, chain, cables, or the like.

Conveyor systems 104, 106, 108a, 108b, 110 may comprise one or more tracks or rails 128 that sleds 130 move within. For example, sleds 130 may move within a single, common track or rail 128. Sleds 130 may move independently from one another within the common track or rail 128. In other embodiments, sleds 130 may move within separate tracks or rails 128. Similarly, sleds 130 may move independently from one another within the separate tracks or rails 128.

In some embodiments, for instance, each sled 130 may include a motor 134 that can activate wheels 132 to move sleds 130 along rail 128. Motors 134 on sleds 130 can be activated at different times, for different durations, in different directions, and/or at different speeds to move sleds 130 closer together or further away from each other. In other embodiments, as discussed below, sleds 130 may be magnetically attached to rail 128 and moved along rail 128 by changing the polarity of rail 128 adjacent to sled 130. Conveyor systems 104, 106, 108a, 108b, 110 may include other mechanisms for moving sleds 130 along rail 128.

By way of example, sleds 130 may be spaced apart a first distance as shown in FIG. 2A. Motors 134 from one or both of sleds 130 may be activated to move sleds 130 towards one another in the direction of the illustrated arrows. Similarly, motors 134 from one or both of sleds 130 may be activated to move sleds 130 further apart from one another (e.g., in a direction opposite to the illustrated arrows in FIG. 2A). In some embodiments, sleds 130 may move relative to one another in directions that is along the length of rail 128, as shown in FIG. 2A. In other embodiments, sleds 130 (or portions thereof) may move relative to one another in directions transverse to the length of rail 128.

Sleds 130 (or portions thereof) may be repositioned relative to one another in order to adjust the distance between holding devices 136 on sleds 130. For instance, as shown in FIGS. 2A and 2B, sleds 130 may be repositioned closer to one another so that holding devices 136 engage opposing sides of packaging container 124. With holding devices 136 engaged with opposing sides of packaging container 124, sleds 130 may move together (e.g., with similar speeds, directions, etc.) in order to hold and move packaging container 124 along rail 128.

Holding devices 136 may securely hold packaging container 124 such that sleds 130 may move along rail 128 at speeds that are higher than typical for roller or belt conveyer systems. In particular, because holding devices 136 securely hold packaging container 124 (rather than relying solely on friction between rollers/belts and the packaging container), sleds 130 can move at higher speeds with less risk of packaging container 124 slipping, tipping over, or falling off of conveyor system 104, 106, 108a, 108b, 110.

The speeds at which sleds 130 move packaging container 124 may be dynamically controlled. By way of example, the speeds of sleds 130 may be adjusted based on the size of packaging container 124 (e.g., height, width, length), the weight of packaging container 124 and/or the goods disposed therein, characteristics of the goods (e.g., fragile, etc.) disposed within packaging container 124, and the like.

Turning now to FIG. 3, there is illustrated an example embodiment of a sled 130. In the illustrated embodiment, sled 130 includes a body 138. Connected to body 138 are wheels 132 that can ride in the channels of rail 128. A motor 134 that activates/drives wheels 132 may be housed within body 138. Holding device 136 is also connected to body 138. In the illustrated embodiment, holding device 136 is connected to body 138 via a pivot device 140, which will be discussed in greater detail below.

In the illustrated embodiment, holding device 136 includes a horizontal surface 142 and a vertical surface 144. Horizontal surface 142 can extend at least partially underneath a packaging container 124 to support the packaging container 124 from underneath. The vertical surface 144 can be positioned adjacent to or against a vertical or generally vertical surface of the packaging container 124. When a pair of sleds 130 are used to move a packaging container 124, the vertical surfaces 144 from the pair of sleds 130 can be positioned adjacent to or against opposing sides of the packaging container 124 to secure the packaging container 124 between the vertical surfaces 144.

As can be seen in FIG. 3, holding device 136 may also include one or more retention elements 146 disposed on or integrated with vertical surface 144. Horizontal surface 142 may also include one or more similar retention elements. When a packaging container is disposed between a pair of sleds 130, retention elements 146 may compress and at least partially conform to the shape of packaging container 124. In some embodiments, retention elements 146 may extend at least partially around sides of packaging container 124 to limit or prevent lateral movement of packaging container 124 relative to holding devices 136.

In the illustrated embodiment, retention elements 146 are formed of a material that has resilient, compression, slip resistant characteristics. For instance, retention elements 146 may be formed of foam, rubber, foam rubber, leather, cotton, or the like.

Figure 4A:
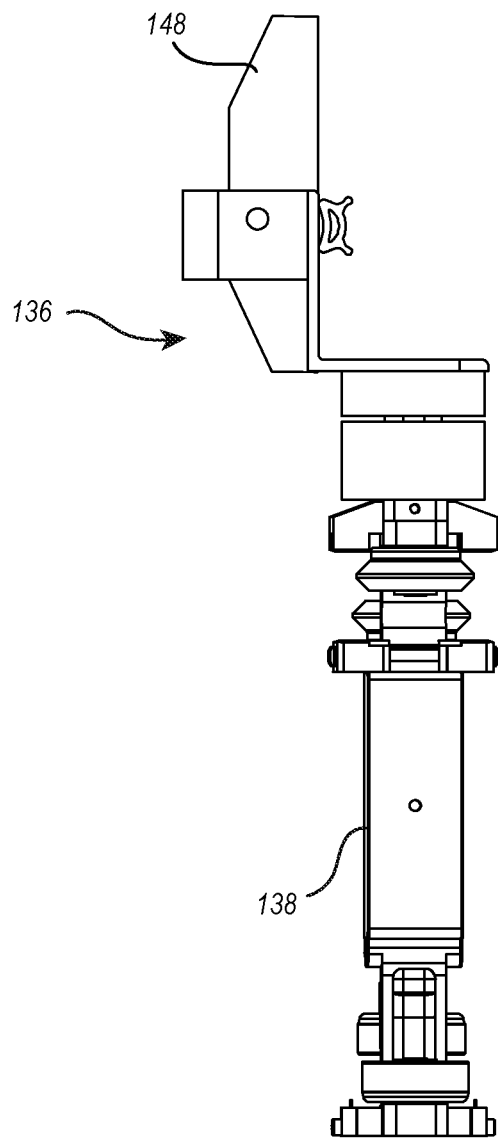
Figure 4B:
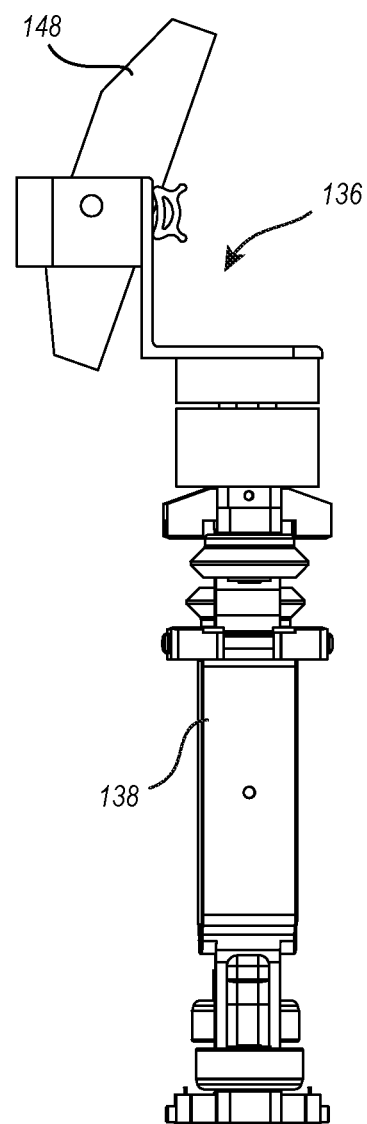

As can be seen in FIG. 3, holding device 136 may also, or alternatively, include an envelope retainer 148. Envelope retainer 148 may include a vertical retention channel 150 into which an edge of an envelope may be received. As shown in FIGS. 4A and 4B, envelope retainer 148 may be pivotally mounted on holding device 136. FIG. 4A illustrates envelope retainer 148 in a neutral or vertical position. In contrast, FIG. 4B illustrates envelope retainer 148 pivoted to an angled position. Envelope retainer 148 may pivot to the angled position in order to open a top end of an envelope to facilitate filling of the envelope with goods.

Figure 5:
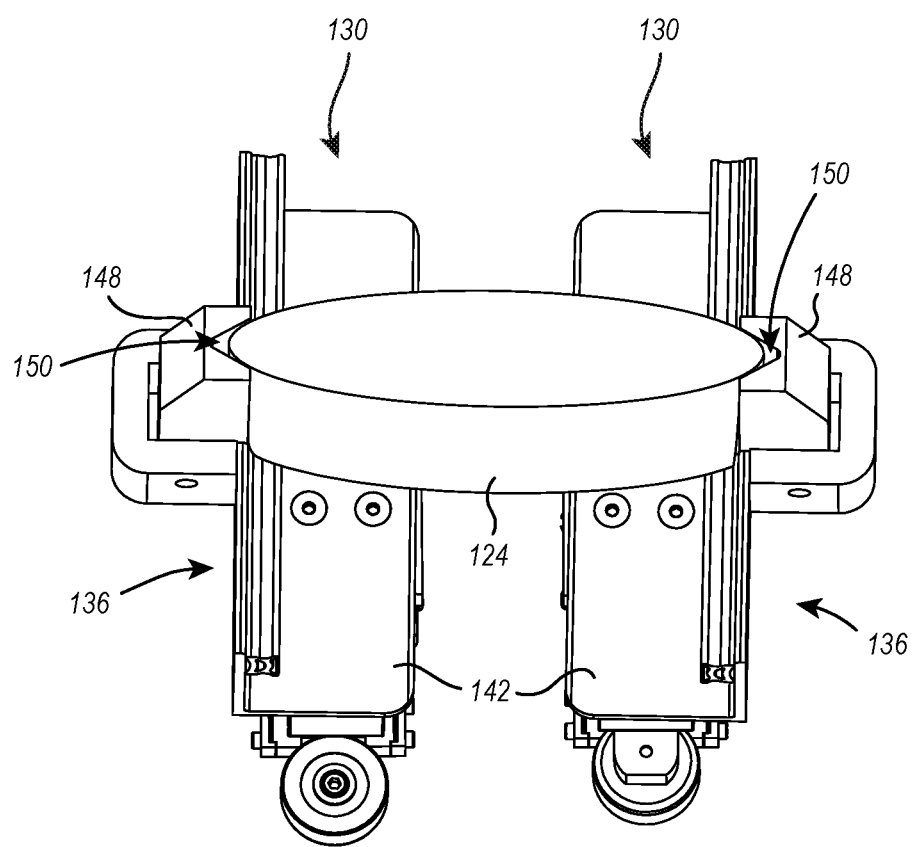
FIG. 5 illustrates the example sleds of FIGS. 3-4B holding an envelope according to an example embodiment.

For instance, FIG. 5 illustrates a pair of sleds 130 holding an envelope 124. As can be seen, the opposing edges of envelope 124 are disposed in vertical retention channels 150 of envelope retainers 148. Furthermore, envelope retainers 148 are pivoted to the angled position such that the top ends of envelope retainers 148 are closer together than the bottom ends thereof. Positioning the top ends of envelope retainers 148 closer together than the bottom ends causes the top end of envelope 124 to open as shown in FIG. 5. With the top end of envelope 124 open, goods can be readily inserted into envelope 124. Thereafter, envelope retainers 148 may pivot back to the vertical or neutral position (FIG. 4A) to allow the top end of envelope 124 to close.

Figure 6:
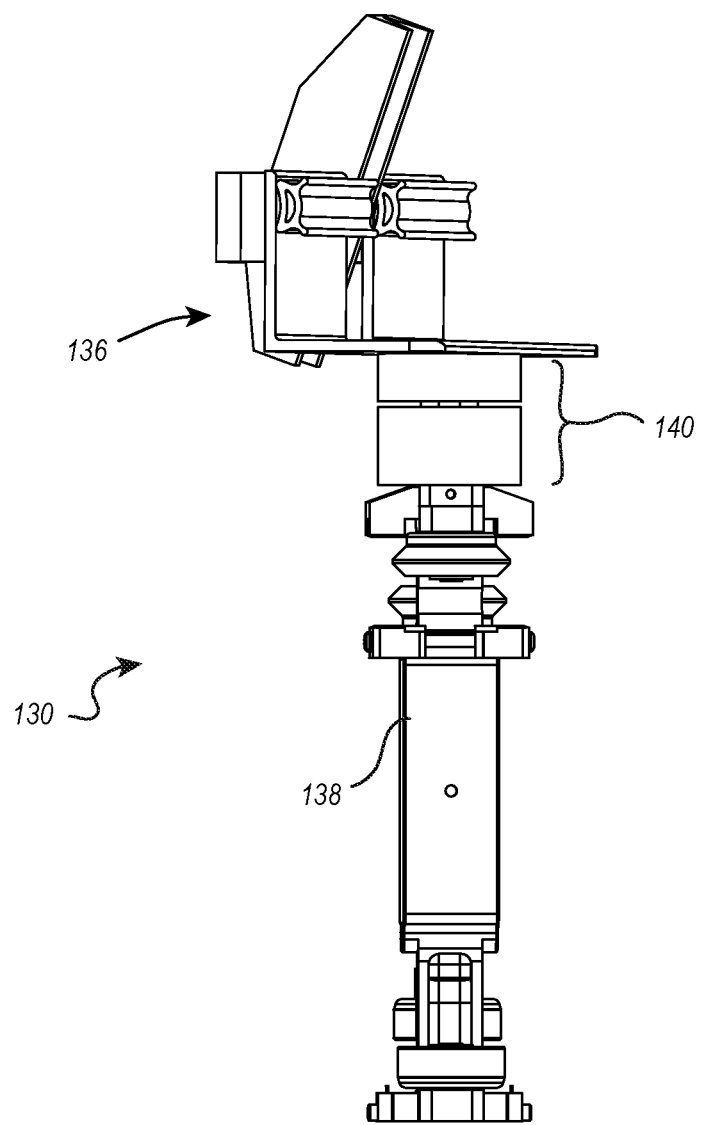
FIG. 6 illustrates the example sled of FIGS. 3-4B in a rotated or pivoted a configuration according to an example embodiment.

Attention is now directed to FIG. 6. As mention above, holding device 136 is connected to body 138 via pivot device 140. Pivot device 140 enables holding device 136 to pivot relative to body 138 and vice versa. In FIG. 6, holding device 136 is pivoted relative to body 138 (in comparison to FIG. 3). The ability to pivot holding device 136 relative to body 138 can be useful for a variety of reasons. For instance, if a pair of sleds 130 is to hold a packaging container having an irregular shape (e.g., opposing sides of the packaging container are not parallel to one another), allowing one or both of the holding devices 136 to pivot can create a more secure engagement with the packaging device.

Figure 7:
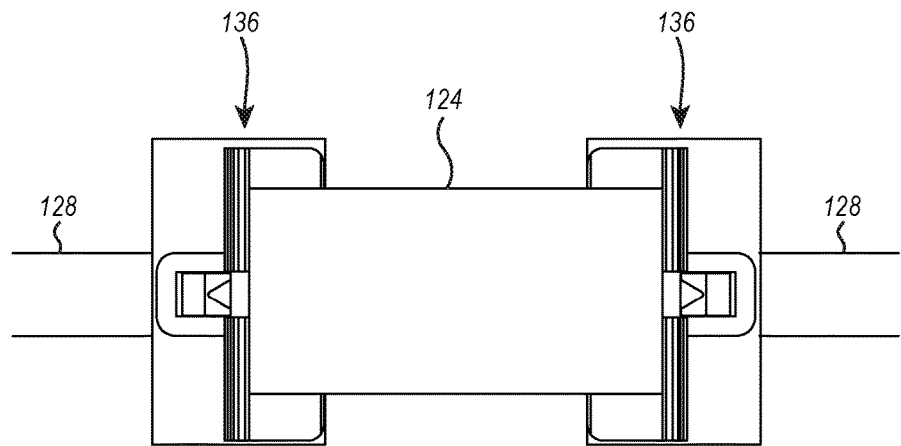
FIGS. 7 and 8 illustrate an example set of sleds holding a packaging container and moving along a track or rail according to an example embodiment.

Another reason for allowing holding device 136 to pivot relative to body 138 is to accommodate turns, curves, or bends in rail 128. As shown in FIG. 7, when rail 128 is linear and a pair of holding devices 136 are holding a rectangular packaging container 124, holding devices 136 are oriented parallel to one another and perpendicular to rail 128.

Figure 8:
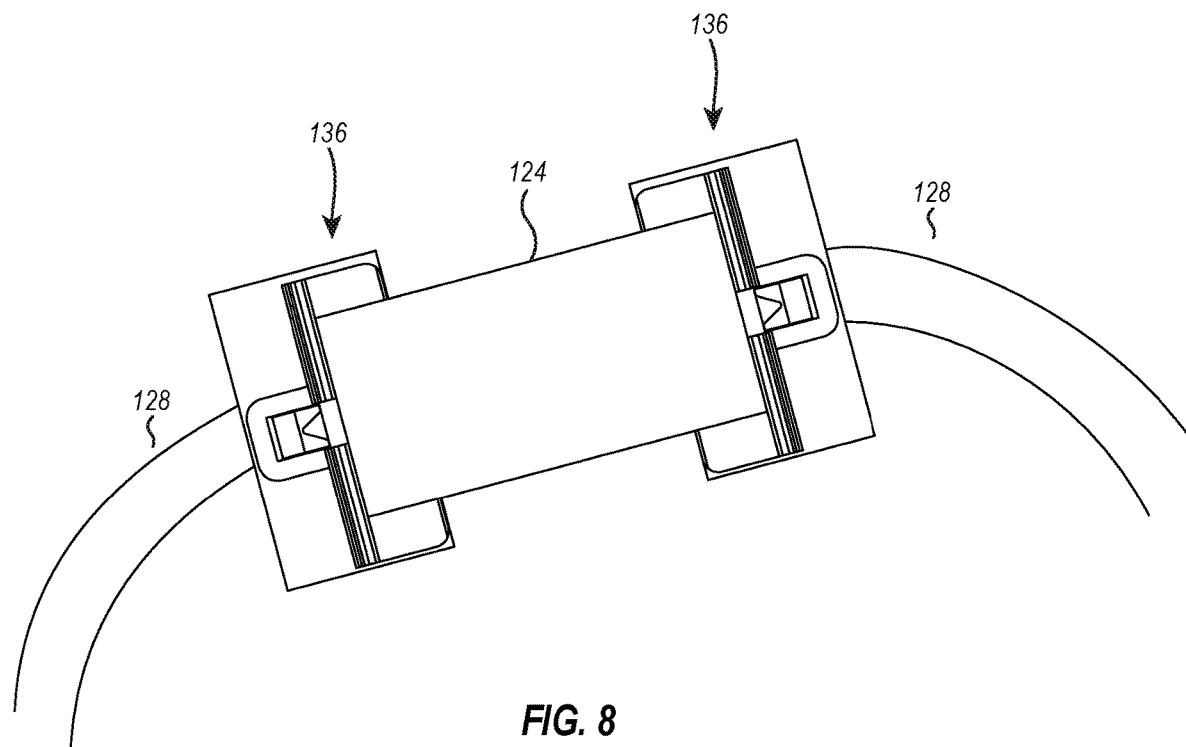

In contrast, when a pair of holding devices 136 is moving a packaging container 124 around a curve in rail 128, as shown in FIG. 8, one or both of holding devices 136 may need to pivot relative to body(ies) 138 such that holding devices 136 remain parallel (or at another predetermined angle) relative to one another and such that one or both of holding devices 136 extends transversely across rail 128 at a non-perpendicular angle. In particular, one or both of holding devices 136 may need to pivot relative to body(ies) 138 to enable wheels 132 to stay within the channels in rail 128 while also maintaining secure contact with the packaging container 124.

If holding devices 136 could not pivot relative to their respective bodies 138, then wheels 132 may bind in or be pulled out of the channels in rails 128. Alternatively, if wheels 132 were maintained in the channels in rail 128, then the entirety of sled 130 may rotate (relative to the packaging container 124) as the sled goes around a corner, bend, or curve in rail 128. The rotation of the entirety of sled 130 relative to the packaging container 124 may decrease the engagement between holding device 136 and packaging container 124 to the point that packaging container 124 may become freed from sleds 130 undesirably.

FIGS. 7 and 8 illustrate sled 130 being offset from one another longitudinally along rail 128. For instance, holding devices 136 extend transversely relative to rail 128. In such case, a pair of sleds 130 may hold a packaging container 124 therebetween with forces that are directed generally parallel to the length of rail 128. However, this arrangement is merely exemplary. In another embodiments, for example, sleds 130 may be associated with opposing sides of rail 128 or separate rails. In such embodiments, holding devices 136 may extend parallel, generally parallel, or along a length of rail 128. In such case, a pair of sleds 130 may hold a packaging container 124 therebetween with forces that are directed transversely relative to the length of rail 128.

Figure 9:
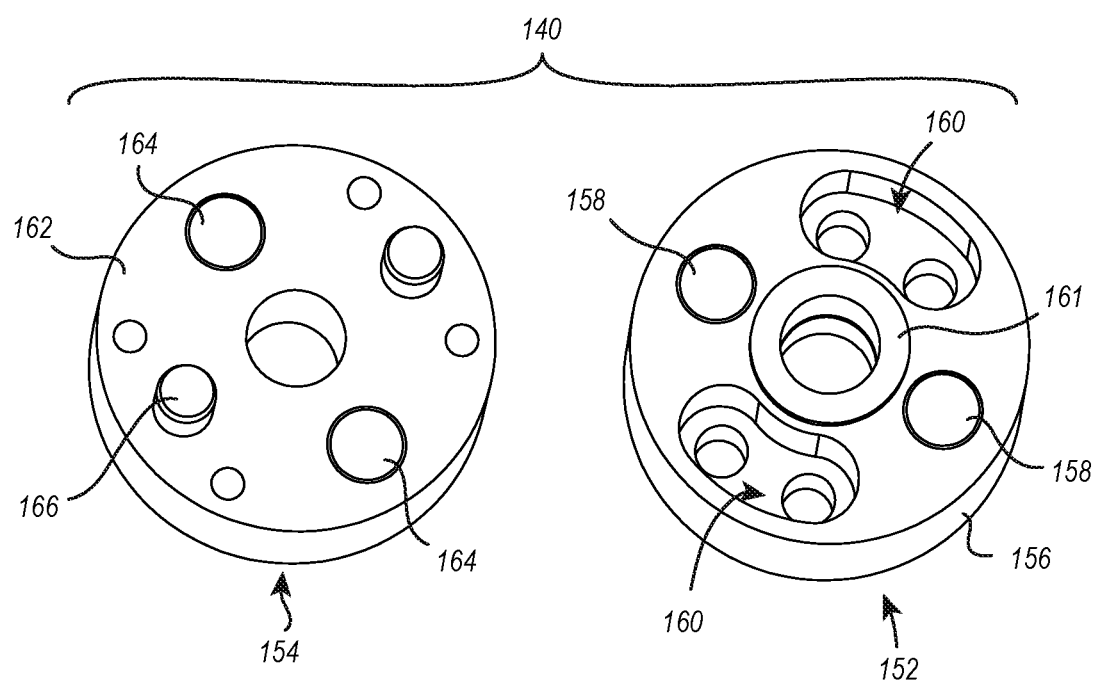
FIG. 9 illustrates a partially exploded view of a pivot device for use with the sleds of FIGS. 3-8 according to an example embodiment.

Turning now to FIG. 9, there is illustrated one example embodiment of pivot device 140 in a partially exploded view. As can be seen, pivot device 140 includes a first half 152 and a second half 154, which can pivot relative to one another when assembled together. First half 152 includes a body 156 with one or more magnetic members 158 mounted therein, one or more limit channels 160, and one or more bearings 161. Similarly, second half 154 includes a body 162 with one or more magnetic members 164 mounted therein. Body 162 also has one or more limit pins 166 extending therefrom.

When pivot device 140 is assembled, one or more magnetic members 158 and one or more magnetic members 164 may be aligned with one another and attract first half 152 and second half 154 together. Additionally, one or more limit pints 166 may extend into one or more limit channels 160. Once assembled, first half 152 and second half 154 may pivot relative to one another. One or more bearings 161 may interface between first half 152 and second half 154 to facilitate smooth pivoting therebetween.

When first half 152 and second half 154 pivot relative to one another, one or more limit pins 166 may move through one or more limit channels 160. The length of one or more limit channels 160 may limit the degree to which first half 152 and second half 154 may pivot. For instance, one or more limit channels 160 may extend 15°, 30°, 45°, 60°, 75°, or 90° about first half 152. When one or more limit pins 166 reach the end of one or more limits channels 160, the interaction between one or more limit pins 166 and the ends of one or more limit channels 160 can prevent first half 152 and second half 154 from pivoting further.

In addition to holding first half 152 and second half 154 together, one or more magnetic members 158 and one or more magnetic members 164 may also bias first half 152 and second half 154 to a neutral position. In the neutral position, one or more magnetic members 158 and one or more magnetic members 164 may be aligned with one another. In contrast, when first half 152 and second half 154 are pivoted relative to one another, one or more magnetic members 158 and one or more magnetic members 164 may be at least partially misaligned with one another. When the force causing first half 152 and second half 154 to pivot is removed, the magnetic attraction between one or more magnetic members 158 and one or more magnetic members 164 may cause first half 152 and second half 154 to pivot back to the neutral position where the magnetic members are aligned with each other.

In some embodiments, each of one or more magnetic members 158 and one or more magnetic members 164 are formed of magnetic materials. In other embodiments, one or more magnetic members 158 and one or more magnetic members 164 may be paired, with one of the members being formed of a magnetic material and the other member being formed of a material that is attracted by magnets.

Figure 10:
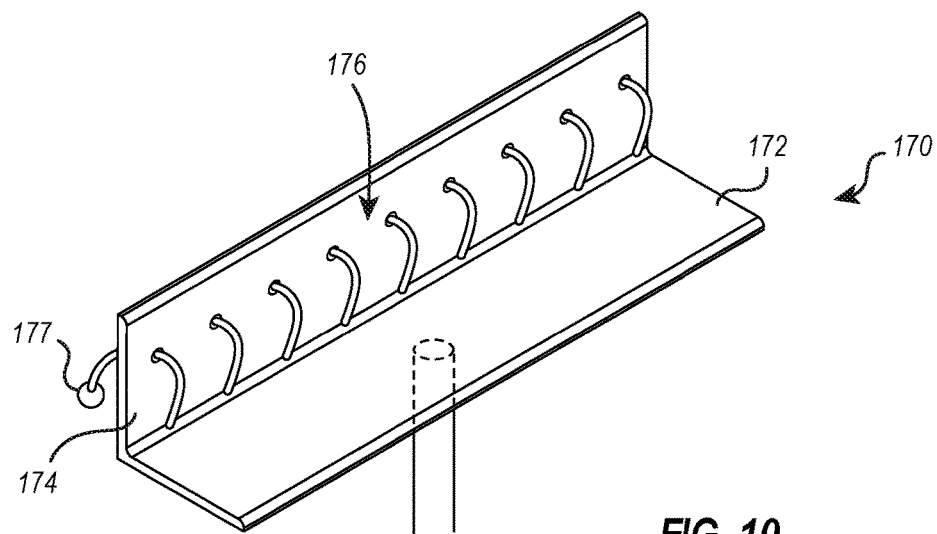
FIGS. 10 and 11 illustrate additional example sleds for use with the conveyor system of FIGS. 2A and 2B.
Figure 11:
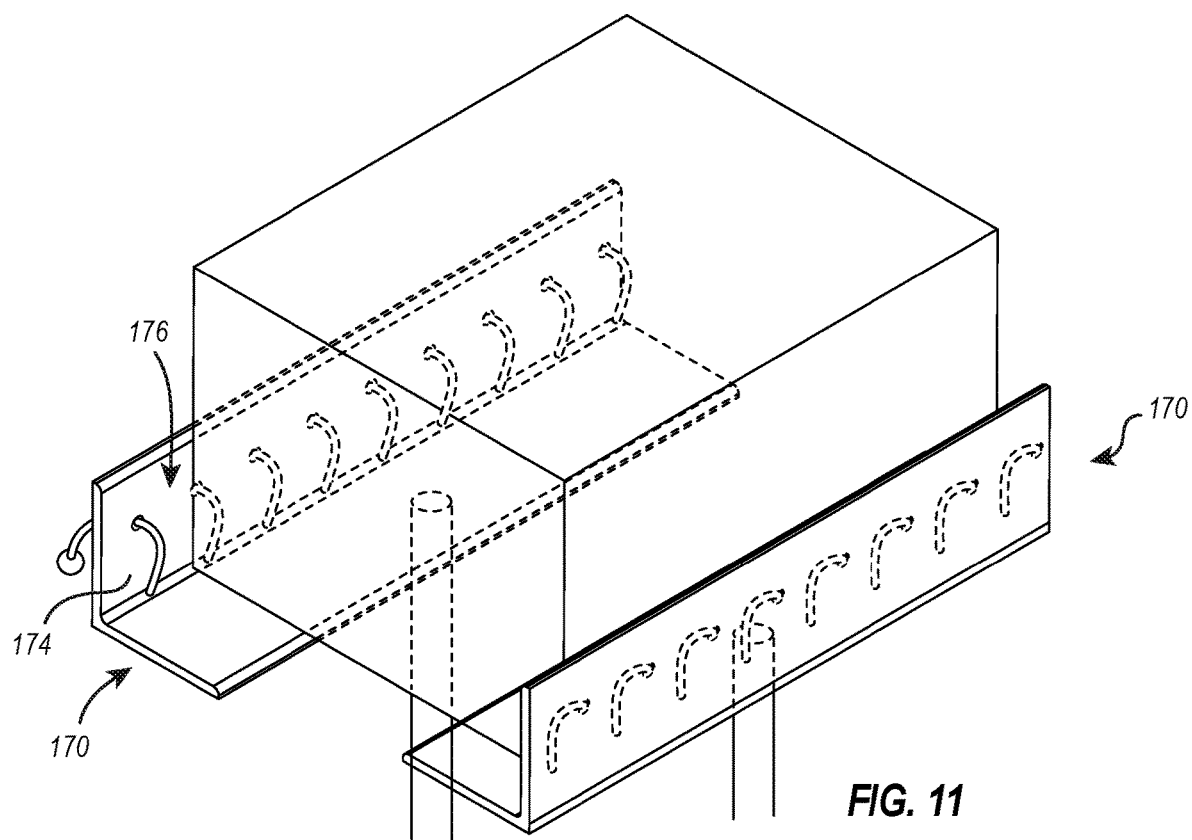

Attention is now directed to FIGS. 10 and 11, which illustrate an alternative embodiment for retention elements on the vertical surfaces of a holding device. FIG. 10 illustrates a holding device 170 that can be similar or identical to holding device 136 in many respects. For instance, holding device 170 includes a horizontal surface 172 and a vertical surface 174 that can be similar or identical to horizontal surface 142 and vertical surface 144.

Also, like holding device 136, holding device 170 includes retention elements 176 on the vertical surface 174. In the illustrated, the retention elements 176 extend away from a front surface of vertical surface 174. Retention elements 176 may be biased to a raised position as shown in FIG. 10. The rejection elements 176 may be biased to the raised position via a spring or counterweight. Counterweight 177 may be disposed adjacent to a rear surface of vertical surface 174, as shown in FIG. 10.

Retention elements 176 may be configured to be compressed or lowered towards vertical surface 174 when vertical surface 174 is positioned adjacent to a packaging container. For instance, FIG. 11 illustrates a pair of holding devices 170 disposed on opposing sides of a packaging container 124. As can be seen, retention elements 176 that are disposed between vertical surfaces 174 and packaging container 124 are moved to a compressed or lowered position. When retention elements 176 are in the compressed or lowered position, packaging container 124 can be positioned closer to vertical surfaces 174.

In contrast, retention elements 176 near the ends of holding devices 170 (e.g., where packaging container 124 is not positioned) are in the raised position. These retention elements 176 that are not directly between vertical surfaces 174 and packaging container 124 can interface with the sides of packaging container 124. For instance, these retention elements 176 can limit or prevent lateral movement of packaging container 124 relative to the rest of holding devices 170.

Turning now to FIG. 12, FIG. 12 illustrates a schematic diagram of a computer system for high-speed packaging container delivery. The depicted high-speed packaging container delivery system 200 (referred to herein as the "computer system") is shown as being executed on a desktop computer 210, but may also be executed on a server, an integrated system, or any other system capable of executing computer code. Computer system 200 comprises one or more processors 220, a network interface 230, a cubing processor 240, and computer-readable media 250. Each of these components may comprise a solely software structure, a solely hardware structure, or a combination of software and hardware. For the sake of example and explanation, computer system 200 is shown communicating with a packaging production machine 102. One will appreciate that computer system 200 may also be in communication with conveyor systems 104, 106, 108a, 108b, 110 such that computer system 200 can control the movement of target products, packaging templates, and packaging containers across conveyor systems 104, 106, 108a, 108b, 110.

In at least one embodiment, computer system 200 receives, at one or more processors 220, dimension information describing physical dimensions of a group of one or more target products that are to be boxed. The dimension information may comprise dimensions of each of the one or more target products or dimensions of a requested custom-made packaging container size. In at least one embodiment, computer system 200 receives identification numbers for each of the one or more target products. Computer system 200 then requests and receives the individual dimensions of each target product from a database. Cubing processor 340 then determines dimensions of a particular packaging container 124 that will properly hold the one or more target products.

Additionally, computer system 200 generates a packaging production request for a packaging production machine 102. The packaging production request comprises instructions configured to cause packaging production machine 102 to generate a particular packaging container 124 that is sized based upon the dimension information. Packaging production machine 102 generates a packaging container 124. As described above, packaging container 124 may comprise a packaging template, a completed box, a packaging envelope, or any other packaging component.

In addition, computer system 200 is configured to receive the particular packaging container 124 on a particular dynamic transportation mechanism, such as the conveyor systems 104, 106, 108a, 108b, 110. In at least one embodiment, the particular dynamic transportation mechanism is configured to automatically physically size itself to carry the particular packaging container 124 as described above with respect to sleds 130.

In particular, the particular dynamic transportation mechanism may comprise a first independently controlled sled 130 and a second independently controlled sled 130 that are configured to be adjustable closer to each other or further apart from each other. For example, computer system 200 generates a spacing command for the particular dynamic transportation mechanism. The spacing command is configured to cause the first independently controlled sled 130 and the second independently controlled sled 130 to move a particular distance away from each other. The particular distance is determined based upon a width or length dimension of the particular packaging container 124.

For instance, a particular packaging container may comprise a width of one-half meter. As such, computer system 200 may generate a spacing command for one-half meter in order to properly space the first independently controlled sled 130 and a second independently controlled sled 130 to hold the particular packaging container. In the case of a packaging envelop, and as described above, the spacing command may comprise less than a width or length of the packaging envelope such that an inward pressure is placed on the packaging envelope—causing the packaging envelope to open.

Computer system 200 may also associate, with one or more processors 220, the particular packaging container 124 with a particular donor bin. The particular donor bin contains at least one of the one or more target products. Despite being associated with the particular packaging container 124, the particular donor bin may need to be retrieved from a warehouse area and placed on conveyor systems 104, 106, 108a, 108b, 110. Alternatively, the particular donor bin may already be positioned on conveyor systems 104, 106, 108a, 108b, 110 in response to a previous packaging request that also included the product that is contained within the donor bin.

Computer system 200 may generate a queue command that is configured to cause the particular dynamic transportation mechanism with the particular packaging container 124 to physically move itself into a queue of a set of dynamic transportation mechanisms. For example, the queue command may move the particular dynamic transportation mechanism to conveyor system 108a or conveyor system 108b. The particular dynamic transportation mechanism may remain in the queue until computer system 200 determines an optimal time to move the particular dynamic transportation mechanism to a packing station 112, 114, 116, 118.

For example, computer system 200 may receive a request to package a second packaging container with a particular item, and the particular item may also be associated with the particular donor bin. In response, computer system 200 generates a packing command that is configured to cause both (1) the particular dynamic transportation mechanism to physically move itself out of the queue and to a particular packing station (e.g., packing station 112) where the particular donor bin is located, and (2) a second dynamic transportation mechanism associated with the second packaging container to physically move itself to the particular packing station 112.

A user at the particular packing station 112 is then able to quickly and efficiently pack multiple separate packaging containers 124 by leveraging a single donor bin that includes items that need to be placed within both packaging containers 124. In additional embodiment, computer system 200 may send multiple sequential donor bins and multiple packaging containers 124 to packing station 112, such that the user is putting multiple items from multiple donor bins into multiple packaging containers 124.

As an example of an embodiment, one donor bin at a time is sent to packing station 112. Once the donor bin has arrived, multiple dynamic transportation mechanisms with the packaging containers are also sent to packing station 112. A user is then able to put the particular type of item that is associated with the one donor bin into each of the packaging containers. The packaging containers are then placed back into the queue if additional target products are still needed or sent to shipping if they have received all of their target products. Each packaging container placed in the queue can be moved back to a packing station 112 when another donor bin arrives with a target product that is associated with the packaging container. As such, the user is packing items into packaging containers 124 so that the items and the packaging containers 124 can be shipped.

In at least one embodiment, the selection of the particular packaging containers and particular donor bins is made based upon optimization algorithms that are meant to minimize the total distance of travel of the donor bins and packaging containers 124 within the warehouse and/or the conveyor systems 104, 106, 108a, 108b, 110. Additionally or alternatively, the selection of the particular packaging containers and particular donor bins is made based upon machine learning algorithms that are designed to optimize output of filled packaging containers 126. Further, additionally or alternatively, the optimization algorithm may group orders in batches to ensure the largest number of common items are packaged at the same time. Such optimizations may significantly increase the speed and efficiency of a packaging system. In any case, the dynamic transportation mechanisms and/or conveyor systems 104, 106, 108a, 108b, 110 are configured for high-speed movements, such that the movements of the packaging containers between different desired locations occurs within seconds.

Figure 13:
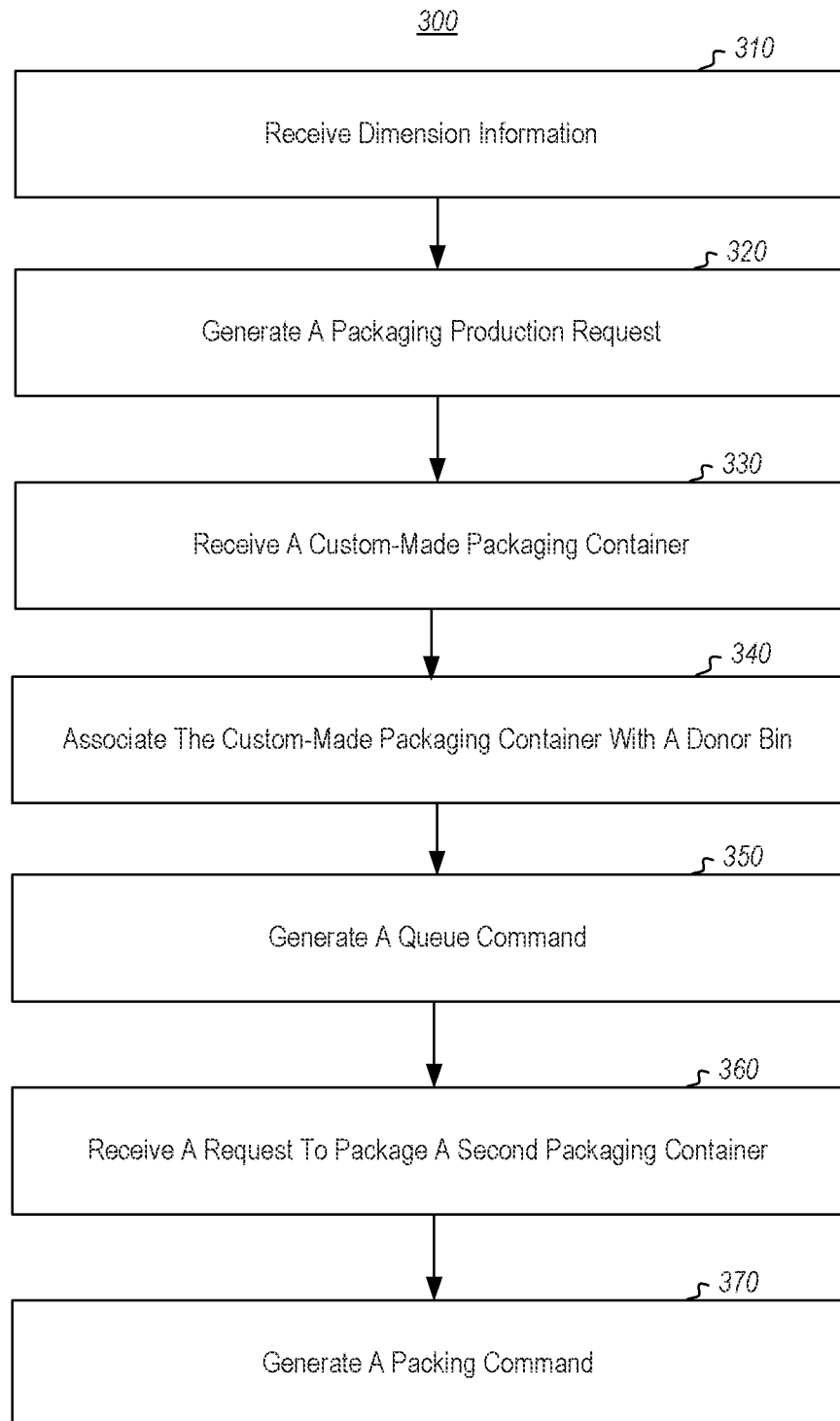
FIG. 13 illustrates a flow chart of a method for high-speed and high-efficiency packaging of items.

FIG. 13 illustrates a flow chart of a method 300 for high-speed and high-efficiency packaging of items. Method 300 includes act 310 of receiving, at the one or more processors, dimension information describing physical dimensions of a group of one or more target products that are to be boxed. Method 300 also includes an act 320 of generating a packaging production request for a packaging production machine, wherein the packaging production request comprises instructions configured to cause the packaging production machine to generate a particular packaging container that is sized based upon the dimension information. Additionally, method 300 includes an act 330 of receiving the particular packaging container on a particular dynamic transportation mechanism, wherein the particular dynamic transportation mechanism is configured to automatically physically size itself to carry the particular packaging container.

Method 300 further includes an act 340 of associating, with the one or more processors, the particular packaging container with a particular donor bin, wherein the particular donor bin contains at least one of the one or more target products. Additionally, method 300 include act 350 of generating a queue command that is configured to cause the particular dynamic transportation mechanism to physically move itself into a queue of a set of dynamic transportation mechanisms.

Method 300 also includes an act 360 of receiving a request to package a second packaging container with a particular item, wherein the particular item is also associated with the particular donor bin. Further, method 300 includes an act 370 of generating a packing command that is configured to cause both the particular dynamic transportation mechanism to physically move itself out of the queue and to a particular packing station where the particular donor bin is located, and a second dynamic transportation mechanism associated with the second packaging container to physically move itself to the particular packing station.

Figure 14A:
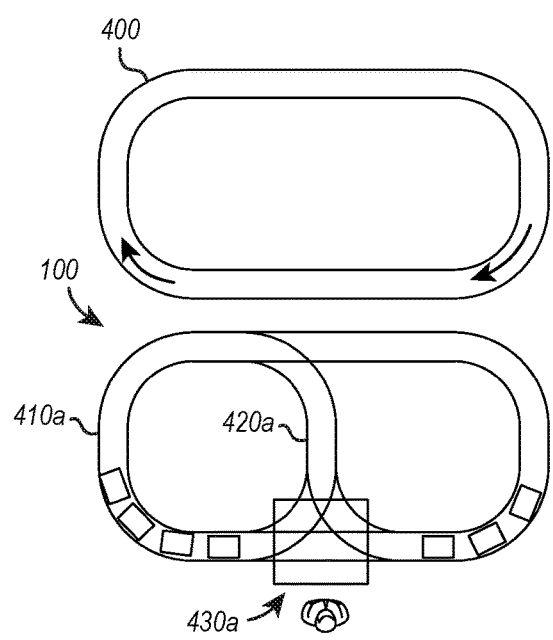
FIGS. 14A and 14B illustrate embodiments of portions of other fulfillment or distribution center systems.
Figure 14B:
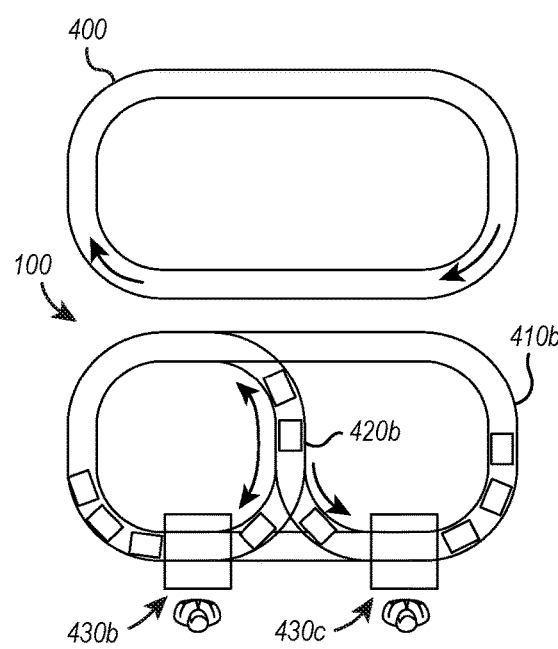

FIGS. 14A and 14B illustrate embodiments of portions of other fulfillment or distribution center systems 100. The illustrated systems include conveyor systems 400, 410a, 410b, 420a, 420b, and packing stations 430a, 430b, and 30c. While not depicted in FIGS. 14A and 14B, the disclosed fulfillment or distribution center systems 100 may comprise packaging production machine(s) 102 and other components as depicted and described above (for example in FIG. 1). As such the embodiment depicted in FIGS. 14A and 14B may operate with packaging containers as described above.

FIG. 14A depicts a fulfillment or distribution center system 100 with a single packing station 430a, while FIG. 14B depicts a fulfillment or distribution center system 100 with two packing stations 530b and 530c. Both depicted fulfillment or distribution center systems 100 comprise additional respective conveyor systems 420a, 420b that are referred to herein as a "parking areas." In at least one embodiment, parking areas 420a, 420b are used to dynamically and intelligently manage the flow of packaging containers 124 to packing stations 430a, 430b, and 430c.

For example, a packaging container 124 may be carried by a sled on conveyor system 400. The sled may be magnetically attached to conveyor system 400 such that conveyor system 400 can change polarity around the area of the sled when the sled is positioned between conveyor system 400 and conveyor systems 410a or 410b. Conveyor system 410a, 410b may activate an electronic magnetic at substantially the same time and location such that that the sled is transferred from conveyor system 400 to conveyor system 410a, 410b. As described elsewhere herein, the sleds may be connected to and moved along the conveyor systems 410a or 410b via mechanisms that do include magnetic attachments. For instance, in other embodiments, the sleds may be moved along conveyor systems 410a or 410b via motors, chains and sprockets, or any other suitable mechanism. In any event, the sled and the associated packaging container 124 then travel around conveyor systems 410a, 410b respectively.

Conveyor systems 410a, 410b are both configured to utilize the parking areas 420a, 420b to queue packaging containers 124 in order to optimize the flow of packaging containers 124 and target products through packing stations 430a, 430b, 430c. For example, in FIG. 14A, a single packing station 430a is fed by the conveyor system 410a. In at least one embodiment, an order for a particular item may be received. A computer system may determine that the particular item is a high-popularity item such that it is ordered with a frequency that exceeds a particular threshold. The particular threshold may be user specified or set by the computer system.

Upon receiving the order, a packaging production machine 102 generates a packaging container 124 that is custom-sized to fit the particular item. In some cases, the packaging container 124 may be custom-sized to fit the particular item along with other items in the same order. The packaging container 124 is then placed on a sled and delivered to conveyor system 400, which in turn passes the packaging container 124 and sled to conveyer system 410a.

Due to the particular item being a high-popularity item, the computer system may cause the particular item to be placed within the parking area 420a. The sled and packaging container 124 will remain in the parking area 420a until a second order for the same particular item is received. Upon receiving the second order, a second packaging container 124 will be made to fit the second order (and possibly other items in the second order). Once complete, the second packaging container 124 will be sent to the packing station 430a and the sled and first packaging container 124 will be removed from the parking area 420a and also sent to the packing station 430a.

A user at the packing station 430a will receive both packaging containers 124 at the packing station 430a at the same time. Additionally, a single donor bill will be able to provide the particular item to both packaging containers 124. Accordingly, the system is able to increase efficiency by allowing a user to pack two different orders at the same time using items from a common donor bin. One will appreciate that this concept can be extended to cover multiple popular items being placed within parking area 420a until an optimum time when they are sent to packing station 430a.

Turning now to FIG. 14B, a system with two packing stations 430a, 430c is depicted. The depicted fulfillment or distribution center systems 100 also comprises a parking area 420b. In the depicted embodiment, only a single parking area 420b is shown, but one will appreciate that additional or alternative embodiments may comprise multiple parking areas 420b. For instance, each packing station 430b, 430c may be associated with its own parking area 420b.

The system 100 operates similar to that described above, except the parking area 420b now acts to dynamically and intelligently manage the flow of packaging containers 124 to both packing stations 430b, 430c. Accordingly, system 100 may place packaging containers 124 and their associated sleds within parking area 420b until additional orders for the same popular product are received. At which point, packaging containers 124 can be simultaneously sent to packing station 430b or 430c to allow multiple packaging containers 124 to be filled from a single donor bin.

In additional or alternative embodiments, fulfillment or distribution center system 100 may also be in communication with a picking system that is delivering the donor bins. The two systems may communicate and operate in order to further optimize the packaging and shipment of goods.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In light of the above, one embodiment of a conveyor system may include a rail having one or more channels therein and a sled operatively associated with the rail. The sled can include a body, one or more wheels mounted on the body and configured to move through the one or more channels in the rail, and a holding device connected to the body, the holding device being configured to engage a packaging container to move the packaging container along the rail.

In some embodiments, the holding device comprises a horizontal surface configured to extend at least partially underneath a packaging container.

In some embodiments, the holding device comprises a vertical surface configured to engage a vertical side of a packaging container.

In some embodiments, the holding device also comprises one or more retention elements associated with the vertical surface.

In some embodiments, the one or more retention elements comprise foam, rubber, foam rubber, leather, cotton, or combinations thereof.

In some embodiments, the one or more retention elements comprise a spring or gravity biased retention element that is biased to a raised position and is configured to be moved to a lowered or compressed position.

In some embodiments, the holding device comprises and envelope retainer.

In some embodiments, the envelope retainer comprises a retention channel configured to receive a side of an envelope therein.

In some embodiments, the envelope retainer is configured to pivot between a neutral position and an angled position.

In some embodiments, the holding device comprises a horizontal surface, a vertical surface, and an envelope retainer.

In some embodiments, the holding device is pivotally connected to the body.

In some embodiments, the holding device is pivotally connected to the body by a pivot device.

In some embodiments, the pivot device comprises a first half and a second half.

In some embodiments, the first half comprises a body with one or more magnetic members mounted therein and one or more limit channels formed therein.

In some embodiments, the second half comprises a body with one or more magnetic members mounted therein and one or more limit pins extending therefrom, the one or more limit pins being configured to extend into the one or more limit channels.

In some embodiments, the conveyor system includes a second sled comprising a body, one or more wheels mounted on the body and configured to move through the one or more channels in the rail, and a holding device connected to the body, the holding device being configured to engage a packaging container to move the packaging container along the rail.

In some embodiments, the sled and the second sled are configured to cooperate to hold a packaging container between the holding device of the sled and the holding device of the second sled.

In some embodiments, the sled and the second sled are configured to move along the rail a packaging container held between the holding device of the sled and the holding device of the second sled.

In some embodiments, the sled and the second sled are configured to move relative to one another along the length of the rail.

In some embodiments, the sled and the second sled are configured to move together along the length of the rail.

In another example embodiment, a method of transporting a packaging container includes positioning a packaging container between a first sled and a second sled of a conveyor system, moving one or both of the first sled and the second sled towards the packaging container, securing the packaging container between the first sled and the second sled, and moving the first sled and the second sled along a rail of the conveyor system to transport the packaging container along the rail.

In some embodiments, moving one or both of the first sled and the second sled towards the packaging container comprising moving the first sled and the second sled independent of one another.

In some embodiments, moving one or both of the first sled and the second sled towards the packaging container comprising moving the first sled and the second sled in opposite directions.

In some embodiments, positioning the packaging container between the first sled and the second sled of the conveyor system comprises transferring the packaging container to the conveyor system from another conveyor system.

In some embodiments, securing the packaging container between the first sled and the second sled comprises supporting the packaging container from underneath by at least one of the first sled and the second sled.

In some embodiments, securing the packaging container between the first sled and the second sled comprises pressing the packaging container into one or more retention elements of the first sled or the second sled.

In some embodiments, moving the first sled and the second sled along a rail of the conveyor system to transport the packaging container along the rail comprises pivoting a holding device of at least one of the first sled and the second sled as the first sled and the second sled go around a corner, bend, or curve in the rail.

In some embodiments, securing the packaging container between the first sled and the second sled comprises positioning an envelope between an envelope retainer on the first sled and an envelope retainer on the second sled.

In some embodiments, positioning the envelope between the envelope retainer on the first sled and an envelope retainer on the second sled comprises pivoting one or both of the envelope retainers towards the other envelope retainer.

In some embodiments, the method also includes releasing the packaging container from between the first sled and the second sled.

In some embodiments, releasing the packaging container from between the first sled and the second sled comprises moving one or both of the first sled and the second sled away from one another.

In another example embodiment, a computer system for high-speed and high-efficiency packaging of items is provided. The computer system includes one or more processors and one or more computer-readable media having stored thereon executable instructions. When executed by the one or more processors, the executable instructions are configured cause the computer system receive a particular packaging container on a particular dynamic transportation mechanism, wherein the particular dynamic transportation mechanism is configured to automatically physically size itself to carry the particular packaging container; associate, with the one or more processors, the particular packaging container with a particular donor bin, wherein the particular donor bin contains at least one of the one or more target products; generate a queue command that is configured to cause the particular dynamic transportation mechanism to physically move itself into a queue of a set of dynamic transportation mechanisms; receive a request to package a second packaging container with a particular item, wherein the particular item is also associated with the particular donor bin; and generate a packing command. The packing command is configured to cause both: the particular dynamic transportation mechanism to physically move itself out of the queue and to a particular packing station where the particular donor bin is located, and a second dynamic transportation mechanism associated with the second packaging container to physically move itself to the particular packing station.

In some embodiments, the packaging container comprises a packaging box.

In some embodiments, the packaging container comprises a packaging envelope.

In some embodiments, the particular dynamic transportation mechanism is configured to hold both the packaging box and the packaging envelope.

In some embodiments, the particular donor bin contains multiples of a single type of product.

In some embodiments, the particular dynamic transportation mechanism comprises a first independently controlled sled and a second independently controlled sled that are configured to be adjustable closer to each other or further apart from each other.

In some embodiments, the executable instructions include instructions that are executable to configure the computer system to generate a spacing command for the particular dynamic transportation mechanism, the spacing command configured to cause the first independently controlled sled and the second independently controlled sled to move a particular distance away from each other, wherein the particular distance is determined based upon a width or length dimension of the particular packaging container.

In some embodiments, the particular packaging container comprises a packaging envelope, and the particular distance is less than a width or length of the packaging envelope.

In some embodiments, the particular dynamic transportation mechanism comprises one or more tracks that the first independently controlled sled and the second independently controlled sled move within.

In another example embodiment, a computer-implemented method, executed on one or more processors using instructions stored in memory, for high-speed and high-efficiency packaging of items is provided. The computer-implemented method includes: receiving a particular packaging container on a particular dynamic transportation mechanism, wherein the particular dynamic transportation mechanism is configured to automatically physically size itself to carry the particular packaging container; associating, with the one or more processors, the particular packaging container with a particular donor bin, wherein the particular donor bin contains at least one of the one or more target products; generating a queue command that is configured to cause the particular dynamic transportation mechanism to physically move itself into a queue of a set of dynamic transportation mechanisms; receiving a request to package a second packaging container with a particular item, wherein the particular item is also associated with the particular donor bin; and generating a packing command. The packing command is configured to cause both: the particular dynamic transportation mechanism to physically move itself out of the queue and to a particular packing station where the particular donor bin is located, and a second dynamic transportation mechanism associated with the second packaging container to physically move itself to the particular packing station.

In some embodiments, the particular packaging container comprises a packaging box.

In some embodiments, the packaging container comprises a packaging envelope.

In some embodiments, the particular dynamic transportation mechanism is configured to hold both the packaging box and the packaging envelope.

In some embodiments, the particular donor bin contains multiples of a single type of product.

In some embodiments, the particular dynamic transportation mechanism comprises a first independently controlled sled and a second independently controlled sled that are configured to be adjustable closer to each other or further apart from each other.

In some embodiments, the method also includes generating a spacing command for the particular dynamic transportation mechanism, the spacing command configured to cause the first independently controlled sled and the second independently controlled sled to move a particular distance away from each other, wherein the particular distance is determined based upon a width or length dimension of the particular packaging container.

In some embodiments, the particular packaging container comprises a packaging envelope, and the particular distance is less than a width or length of the packaging envelope.

In some embodiments, the particular dynamic transportation mechanism comprises one or more tracks that the first independently controlled sled and the second independently controlled sled move within.

In some embodiments, the first independently controlled sled and the second independently controlled sled move within a single, common track.

In another example embodiment, a computer program product comprises one or more physical computer storage media having stored thereon computer-executable instructions that, when executed at a processor, cause a computer system to perform a method for high-speed and high-efficiency packaging of items, the method comprising: receiving a particular packaging container on a particular dynamic transportation mechanism, wherein the particular dynamic transportation mechanism is configured to automatically physically size itself to carry the particular packaging container; associating, with the one or more processors, the particular packaging container with a particular donor bin, wherein the particular donor bin contains at least one of the one or more target products; generating a queue command that is configured to cause the particular dynamic transportation mechanism to physically move itself into a queue of a set of dynamic transportation mechanisms; receiving a request to package a second packaging container with a particular item, wherein the particular item is also associated with the particular donor bin; and generating a packing command that is configured to cause both: the particular dynamic transportation mechanism to physically move itself out of the queue and to a particular packing station where the particular donor bin is located, and a second dynamic transportation mechanism associated with the second packaging container to physically move itself to the particular packing station.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A conveyor system, comprising:
 a rail having one or more channels therein; and
 first and second sleds operatively associated with the rail, the first and second sleds being configured for both independent and coordinated movement along the rail such that the first and second sleds can move closer together and further apart from one another and can move together along the rail, the first and second sleds being configured to cooperate to hold a packaging container therebetween, and the first and second sleds being configured to move together along the rail with the packaging container held therebetween to move the packaging container along the rail, each of the first and second sleds comprising:
  a body;
  one or more wheels mounted on the body and configured to move through the one or more channels in the rail; and
  a holding device connected to the body, the holding device being configured to engage a packaging container to move the packaging container along the rail.

2. The conveyor system of claim 1, wherein the holding device of at least one of the first and second sleds comprises a horizontal surface configured to extend at least partially underneath the packaging container and a vertical surface configured to engage a vertical side of the packaging container.

3. The conveyor system of claim 2, further comprising one or more retention elements associated with the vertical surface.

4. The conveyor system of claim 3, wherein the one or more retention elements comprise foam, rubber, foam rubber, leather, cotton, a spring or gravity biased retention element that is biased to a raised position and is configured to be moved to a lowered or compressed position, or combinations thereof.

5. The conveyor system of claim 1, wherein the holding device comprises and envelope retainer, wherein the envelope retainer comprises a retention channel configured to receive a side of an envelope therein, wherein the envelope retainer is configured to pivot between a neutral position and an angled position.

6. The conveyor system of claim 5, wherein the envelope retainer is configured to hold an envelope (i) in a flat or closed configuration when the envelope retainer is pivoted to the neutral position and (ii) in an open configuration when the envelope retainer is pivoted to the angled position.

7. The conveyor system of claim 1, wherein the holding device is pivotally connected to the body by a pivot device.

8. The conveyor system of claim 7, wherein the pivot device comprises a first half and a second half, wherein:
   the first half comprises a body with one or more magnetic members mounted therein and one or more limit channels formed therein; and
   the second half comprises a body with one or more magnetic members mounted therein and one or more limit pins extending therefrom, the one or more limit pins being configured to extend into the one or more limit channels.

9. A method of transporting a packaging container, the method comprising:
   positioning a packaging container between a first sled and a second sled of a conveyor system;
   moving one or both of the first sled and the second sled towards the packaging container;
   securing the packaging container between the first sled and the second sled by applying a compressive force to the packaging container by the first and second sleds; and
   moving the first sled and the second sled along a rail of the conveyor system to transport the packaging container along the rail.

10. The method of claim 9, wherein moving one or both of the first sled and the second sled towards the packaging container comprises either:
    moving the first sled and the second sled independent of one another or
    moving the first sled and the second sled in opposite directions.

11. The method of claim 9, wherein positioning the packaging container between the first sled and the second sled of the conveyor system comprises transferring the packaging container to the conveyor system from another conveyor system.

12. The method of claim 9, wherein securing the packaging container between the first sled and the second sled comprises:
    supporting the packaging container from underneath by at least one of the first sled and the second sled; and/or
    pressing the packaging container into one or more retention elements of the first sled or the second sled.

13. The method of claim 9, wherein moving the first sled and the second sled along a rail of the conveyor system to transport the packaging container along the rail comprises pivoting a holding device of at least one of the first sled and the second sled as the first sled and the second sled go around a corner, bend, or curve in the rail.

14. The method of claim 9, wherein securing the packaging container between the first sled and the second sled comprises positioning an envelope between an envelope retainer on the first sled and an envelope retainer on the second sled, wherein positioning the envelope between the envelope retainer on the first sled and an envelope retainer on the second sled comprises pivoting one or both of the envelope retainers towards the other envelope retainer.

15. A computer system for high-speed and high-efficiency packaging of items, comprising:
    one or more processors; and
    one or more computer-readable media having stored thereon executable instructions that when executed by the one or more processors configure the computer system to perform at least the following:
       receive a particular packaging container on a particular dynamic transportation mechanism, wherein the particular dynamic transportation mechanism is configured to automatically physically size itself to carry the particular packaging container;
       associate, with the one or more processors, the particular packaging container with a particular donor bin, wherein the particular donor bin contains at least one of the one or more target products;
       generate a queue command that is configured to cause the particular dynamic transportation mechanism to physically move itself into a queue of a set of dynamic transportation mechanisms;
       receive a request to package a second packaging container with a particular item, wherein the particular item is also associated with the particular donor bin; and
       generate a packing command that is configured to cause both:
          the particular dynamic transportation mechanism to physically move itself out of the queue and to a particular packing station where the particular donor bin is located, and
          a second dynamic transportation mechanism associated with the second packaging container to physically move itself to the particular packing station.

16. The computer system of claim 15, wherein the packaging container comprises a packaging box or a packaging envelope.

17. The computer system of claim 16, wherein the particular dynamic transportation mechanism is configured to hold both the packaging box and the packaging envelope.

18. The computer system of claim 15, wherein the particular dynamic transportation mechanism comprises a first independently controlled sled and a second independently controlled sled that are configured to be adjustable closer to each other or further apart from each other.

19. The computer system of claim 18, wherein the executable instructions include instructions that are executable to configure the computer system to generate a spacing command for the particular dynamic transportation mechanism, the spacing command configured to cause the first independently controlled sled and the second independently controlled sled to move a particular distance away from each other, wherein the particular distance is determined based upon a width or length dimension of the particular packaging container.

20. A conveyor system, comprising:
    a rail having one or more channels therein; and
    a sled operatively associated with the rail, the sled comprising:
       a body;
       one or more wheels mounted on the body and configured to move through the one or more channels in the rail; and a holding device connected to the body, the holding device being configured to engage a packaging container to move the packaging container along the rail, wherein the holding device comprises a horizontal surface configured to extend at least partially underneath the packaging container and a vertical surface configured to engage a vertical side of the packaging container, wherein the holding device is pivotally connected to the body by a pivot device, wherein the pivot device comprises a first half and a second half, wherein:

the first half comprises a body with one or more magnetic members mounted therein and one or more limit channels formed therein; and the second half comprises a body with one or more magnetic members mounted therein and one or more limit pins extending therefrom, the one or more limit pins being configured to extend into the one or more limit channels.

* * * * *